June 17, 1969        F. FANTINI        3,451,024
THREE-PHASE DIFFERENTIAL ELECTROTHERMAL RELAY
Filed Aug. 10, 1967
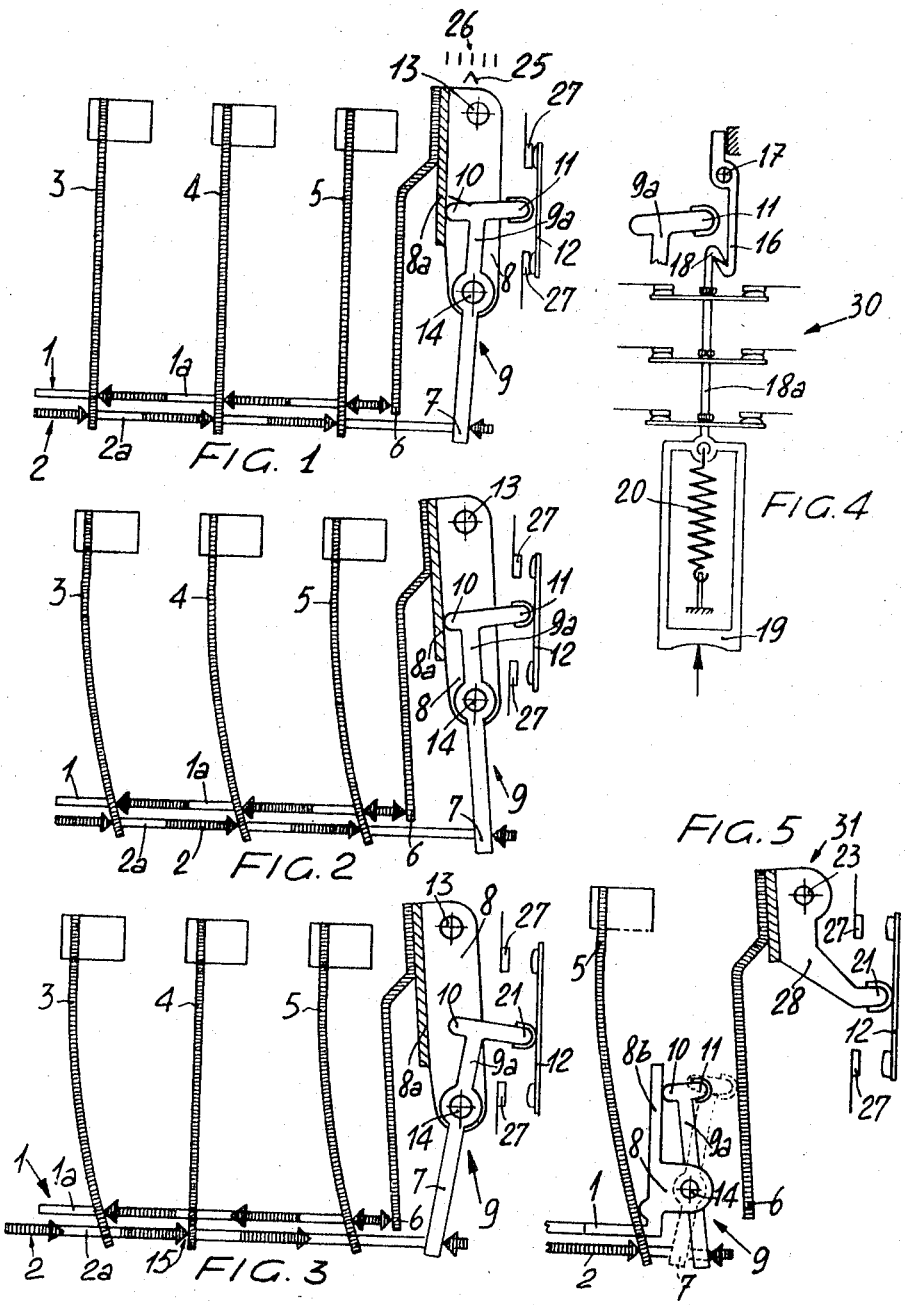
INVENTOR
FRANCESCO FRANTINI
BY *Newton, Hopkins, Jones & Ormsby*
ATTORNEYS United States Patent Office 3,451,024
Patented June 17, 1969

3,451,024
THREE-PHASE DIFFERENTIAL ELECTRO-THERMAL RELAY
Francesco Fantini, Viale Giustiniano 5, Milan, Italy
Filed Aug. 10, 1967, Ser. No. 659,624
Int. Cl. H01h *61/06, 71/16*
U.S. Cl. 337—46        3 Claims

ABSTRACT OF THE DISCLOSURE

A three phase differential electro-thermal relay for peak current protection adapted to intervene in advance should a phase be lacking in the circuit. Two moving, parallel bridges are constructed with offset slots and three bimetallic elements inserted in these slots. The two moving bridges operate a control lever when the bimetals are not in phase with each other.

---

This invention relates to a three-phase differential electrothermal relay for peak current protection adapted to intervene in advance should a phase be lacking in the circuit.

More particularly, this invention relates to an electro-thermal relay as above stated, characterized by comprising: two moving bridges parallel with each other, each of which provided with longitudinal slots for receiving the ends of the three bimetallic elements, the slots of the first bridge being offset to those of the second bridge; a movable plate fast or connected with the first bridge and carrying a pivot; a control lever fulcrummed on said pivot and having an arm contacting the end of the second bridge and the other arm provided with two side extensions, one of which being connected through other parts or elements to the first moving bridge, while the second is adapted to operate on the means for opening the circuit protected by said relay.

The accompanying drawing schematically shows by way of nonlimiting example two embodiments of the device according to the present invention connected to means for opening the circuit.

In this drawing:

FIG. 1 shows a first embodiment of the relay at inoperative position, that is with its thermal elements not run through by electric current;

FIG. 2 shows the relay of FIG. 1 having all of its thermal elements run through by electric current in case of peak current intervention with opening of the driven circuit;

FIG. 3 shows the relay of FIG. 1 having two thermal elements which are curved because run through by electric current and one element which is still straight since not being run through by electric current, the intervention in advance of the relay for opening the driven circuit corresponding to this position;

FIG. 4 shows the end portion of relay in FIG. 1 connected to a multi-pole switch driven or controlled by said relay; and FIG. 5 shows a second embodiment of the relay according to the present invention.

Referring to particularly FIGS. 1, 2 and 3, it will be seen that the differential electrothermal relay according to the present invention comprises two moving bridges parallel with eath other and indicated at 1 and 2, respectively, each of which provided with longitudinal slots 1a and 2a, respectively adapted to receive the ends of three thermal or bimetallic elements 3, 4, 5; and slots 1a and 2a are offset to one another at inoperative position for the unit (see FIG. 1), so that any bimetallic element, such as bimetallic element 3, will lean against the right-hand end of a slot 1a of bridge 1, while leaning against the left-hand end of a slot 2a of bridge 2.

The relay further comprises a rocking plate fulcrummed at 13 and connected to the first moving bridge 1 with the interposition of a thermal compensating element 6 accommodating the calibration of said bimetallic elements 3, 4 and 5 to room temperature changes. Pivot 13, about which said plate 8 oscillates, can be moved along an axis substantially parallel with bridges 1 and 2 so as to calibrate the unit, in order that the intervention range may cover a certain ampere extension. In FIG. 1, calibration is schematically shown through a slide 25 fast with pivot 13 and which may be located at any index 26 of a scale.

Plate 8 carries a pivot 14 forming the fulcrum for a lever 9 having an arm 7 contacting the end of moving bridge 2 and the other arm 9a provided with two side extensions indicated at 10 and 11, respectively. At inoperative position of the relay, extension 10 leans against rib 8a of plate 8.

Extension 11 projects to plate 8 and is suitable to operate on the opening member for the circuit protected by the relay which, in the embodiment of FIGS. 1, 2 and 3, is formed of the contact-holder bridge 12.

The operation of the above relay is as follows:

While the relay at inoperative state has its various elements arranged as shown in FIG. 1, when bimetallic elements 3, 4 and 5 are run through by electric current and thus curve by heating as shown in FIG. 2, such elements will cause said moving bridge 1 to move to the right. Through compensating element 6, movement of said moving bridge 1 will cause plate 8 to rotate about fulcrum 13 and (since extension 10 leans against rib 8a of said plate 8) will also cause lever 9 to move along with plate 8. It is to be noted that, when lever 9 moves, arm 7 thereof will draw bridge 2 therewith, said bridge offering no resistance at all. In this case, extension 11 for arm 9a of lever 9 will press on contact-holder bridge 12 and cause the circuit to open, the terminals of which circuit are indicated at 27 in the figure, this circuit being protected by the relay.

Particularly referring now to FIG. 3, it will be assumed that a phase is lacking in the circuit wherein said relay is connected, and namely that phase corresponding to thermal or bimetallic element 4. In this case, thermal or bimetallic elements 3 and 5 are run through by electric current and move bridge 1 to the right, as stated above. Bimetallic element 4, which is not run through by electric current, remains cold or cools down and accordingly does not curve; as a result, bridge 2 is retained at its inoperative position, or returns thereto in the case said bimetallic element 4 is cooling down. Therefore, upon movement of bridge 1, causing, as above stated, plate 8 to rotate about fulcrum 13, lever 9 retained with its arm 7 by bridge 2 will rotate about its fulcrum 14. As a result, extension 11 of arm 9a of said lever 9 will anticipate its action on said contact-holder bridge 12, with respect to the action defined by the electric current operating on said bimetallic elements 3 and 5. Movement of contact-holder bridge 12 causes the opening of the circuit, the terminals of which are indicated at 27 in the figure.

Referring to FIG. 4, it will be seen that a manually operated peak current switch, indicated as a whole at 30, is shown therein. The relay according to the present invention operates on this per se known switch, of which relay FIG. 4 shows only arm 9a of lever 9 provided with extension 11.

Operation of this extension is entirely similar to that described above in connection with FIGS. 1, 2 and 3. When this extension 11 operates on hooking lever 16 anchored within pivot 17, hook 16 will detach from hook 18 and due to spring 20 switch rod 18a will lower and cause therefore opening of the contacts which had been closed by operation on pushbutton 19.

Referring now to FIG. 5, it will be seen that a further embodiment is shown therein of the relay according to the present invention. Since this embodiment only partly differs from the above described embodiment relating to FIGS. 1, 2 and 3, only the differing elements have been shown in this figure.

According to this further embodiment, movable plate 8, carrying pivot 14 on which control lever 9 is fulcrummed, is integrally formed with first moving bridge 1 and is provided with a projecting arm 8b against which extension 10 of arm 9a for said lever 9 leans.

Compensating element 6 forms an arm for a second lever indicated as a whole at 31, which lever is fulcrummed at 23 and has its other arm 28 adapted to operate on contact-holder bridge 12.

Operation of the relay according to this second embodiment is similar to that described in detail for the first embodiment, and namely:

Should all of the bimetallic elements 3, 4 and 5 be run through by electric current, when bridge 1 and plate 8 fast therewith move, lever 9 will hold extension 10 of its arm 9a against arm 8b, since the movement of said lever 9 is not hindered by moving bridge 2 which is also moving. Therefore extension 11 will strike against thermal compensating element 6 forming part of lever 31 and will cause the latter to rotate so that its arm 28 will outwardly urge said contact-holder bridge 12, thus opening the circuit protected by the relay. In the figure, full lines show the unit at the position taken in this event of overload on three phases.

On the contrary, when a phase is lacking and thereby bridge 2 will not move, it holds arm 7 for lever 9 and the latter will accordingly rotate about the fulcrum 14, thus anticipating its intervention on the sensitive element 6 causing, as stated above, the movement of contact-holder bridge 12 and the resulting anticipated opening of the circuit protected by the relay and having its terminals indicated at 27 in the figure.

Modifications and changes can be made to the electrothermal relay according to the present invention without departing for this from the protective field of the invention.

What is claimed is:
1. A three-phase electrothermal relay for peak current protection, adapted to intervene in advance should a phase be lacking in the circuit, comprising: two moving bridges parallel with each other, each of which is provided with longitudinal slots receiving the ends of three bimetallic elements, the slots of the first bridge being offset to those of the second bridge; a movable plate carrying a pivot; means connected between said plate and said first bridge member; a control lever fulcrummed on said pivot and having an arm contacting the end of the second bridge and another arm provided with two side extensions, one of which is connected through said plate and said means to the first moving bridge; and contact means adjacent said second extension and operated thereby.

2. A relay according to claim 1, wherein said movable plate carries said pivot on which the control lever is fulcrummed, said means connected to the first moving bridge is a thermal compensating element which is rotatable about a pivot which may be displaced from said first bridge for calibrating all the unit, said movable plate being also provided with a rib against which one of the side extensions of an arm for the control lever leans.

3. A relay according to claim 1, wherein said movable plate carrying said pivot on which the control lever is fulcrummed is integrally formed with the first moving bridge and provided with a projecting arm against which one of the side extensions of an arm for the control lever leans, while the other of said extensions is adapted to operate on a thermal compensating element, said compensating element being mounted on the arm of a second lever, said second lever having an arm which is adapted to operate on the contact means of the circuit protected by the relay.

References Cited

FOREIGN PATENTS 994,436  6/1965  Great Britain.
1,199,868  9/1965  Germany.

BERNARD A. GILHEANY, *Primary Examiner.*

R. L. COHRS, *Assistant Examiner.*

U.S. Cl. X.R.

337—49